United States Patent
Arbel et al.

(10) Patent No.: US 7,184,662 B2
(45) Date of Patent: Feb. 27, 2007

(54) SWITCHING NETWORK

(75) Inventors: Ygal Arbel, Belmont, CA (US); Robert Louis Caulk, Livermore, CA (US); Christoph Dominique Loeffler-Lejeune, Sunnyvale, CA (US)

(73) Assignee: Bay Microsysems, Inc., San Jose, CA (US)

( * ) Notice: Subject to any disclaimer, the term of this patent is extended or adjusted under 35 U.S.C. 154(b) by 702 days.

(21) Appl. No.: 09/974,448

(22) Filed: Oct. 10, 2001

(65) Prior Publication Data

US 2007/0025732 A1 Feb. 1, 2007

(51) Int. Cl.
*H04J 14/00* (2006.01)

(52) U.S. Cl. .......................... 398/56; 398/45; 370/372

(58) Field of Classification Search .................. 398/45, 398/46, 52, 55, 56, 50; 370/369–374
See application file for complete search history.

(56) References Cited

U.S. PATENT DOCUMENTS

| 5,329,524 | A | * | 7/1994 | Paker et al. | ................ 370/370 |
| 5,504,739 | A | * | 4/1996 | Chopping | ................... 370/372 |
| 6,400,291 | B1 | * | 6/2002 | Sankey | ....................... 341/100 |
| 6,715,023 | B1 | * | 3/2004 | Abu-Lebdeh et al. | ....... 710/317 |

* cited by examiner

*Primary Examiner*—David C. Payne

(57) ABSTRACT

A two-stage switching network that takes data from an input and first switches it through a space stage into a buffer. Data from the buffer is then switched in a time-space stage to an output. Each buffer, advantageously, holds one frame of data. Further, there are two buffers such that one may be filled from the input while the other is emptied to the output, and vice-versa. A maximum amount of data may be switched in space and time regardless of its origin and destination, effecting a switching network that is capable of the widest SONET-specified bandwidth.

19 Claims, 15 Drawing Sheets

142

SWITCHING NETWORK

FIELD OF THE INVENTION

This invention relates to the field of switching networks, and, more specifically, to a nonblocking switching network that provides high bandwidth add-drop and through switching of multiple data lanes.

BACKGROUND OF THE INVENTION

Fiber optics transmission is the medium of choice for voice and data service provider networks. At the current time, fiber optics provides the highest bandwidth per unit cost of any transmission medium. Early fiber optic systems, however, used proprietary architectures, equipment line codes, multiplexing formats, etc., such that one fiber optic system could not be connected to another unless they were both from the same manufacturer.

In response, the "Synchronous Optical Network" standard, commonly called "SONET", was developed in the U.S. to provide a standard for connecting one optical fiber system to another. SONET (and the virtually identical international standard, "Synchronous Digital Hierarchy" or "SDH") provides specifications for digital transmission bandwidths that formerly were not possible. By using equipment that conform to this standard, service providers can use their currently embedded fiber optic networks to effect higher bandwidth over the same fiber. However, equipment (commonly called "nodes") that can provide add-drop and through switching of SONET-based communications at the wide bandwidth end of the specification is generally unavailable.

SUMMARY OF THE INVENTION

This problem is solved and a technical advance is achieved in the art by a system and method that provides a switching network that can switch up to the maximum bandwidth of SONET in two frames. A plurality of SONET-based data pipes ("lanes") including internode lines in a SONET ring and tributaries ("tribs") is concatenated at an input to the switching network. The switching network according to this invention treats all incoming lanes equally. Thus, added, dropped and through traffic is switched simultaneously, permitting full interchange of all data lanes.

According to this invention, a time slot of data from each input lane is switched in a first space stage during each clock cycle of a frame from an input into a buffer corresponding to the clock cycle. Data from the buffer is then switched in a time-space stage during each clock cycle of a frame to output lanes wherein any row and any column may be moved during each clock cycle. Advantageously, the exemplary embodiment of this invention includes two buffers so that one buffer may be filled from the input while the other is emptied to the output during one frame, and vice-versa.

The exemplary embodiment of this invention illustrates that two lines and up to eight tributaries ("tribs") may be switched through the switching network. Thus, a maximum amount of data may be switched in space and time regardless of its origin and destination, effecting a switching network that is capable of performing add-drop and through switching of the widest SONET-specified bandwidth.

BRIEF DESCRIPTION OF THE DRAWINGS

A more complete understanding of this invention may be obtained from a consideration of the specification taken in conjunction with the drawings, in which.

DETAILED DESCRIPTION

Figure 1:
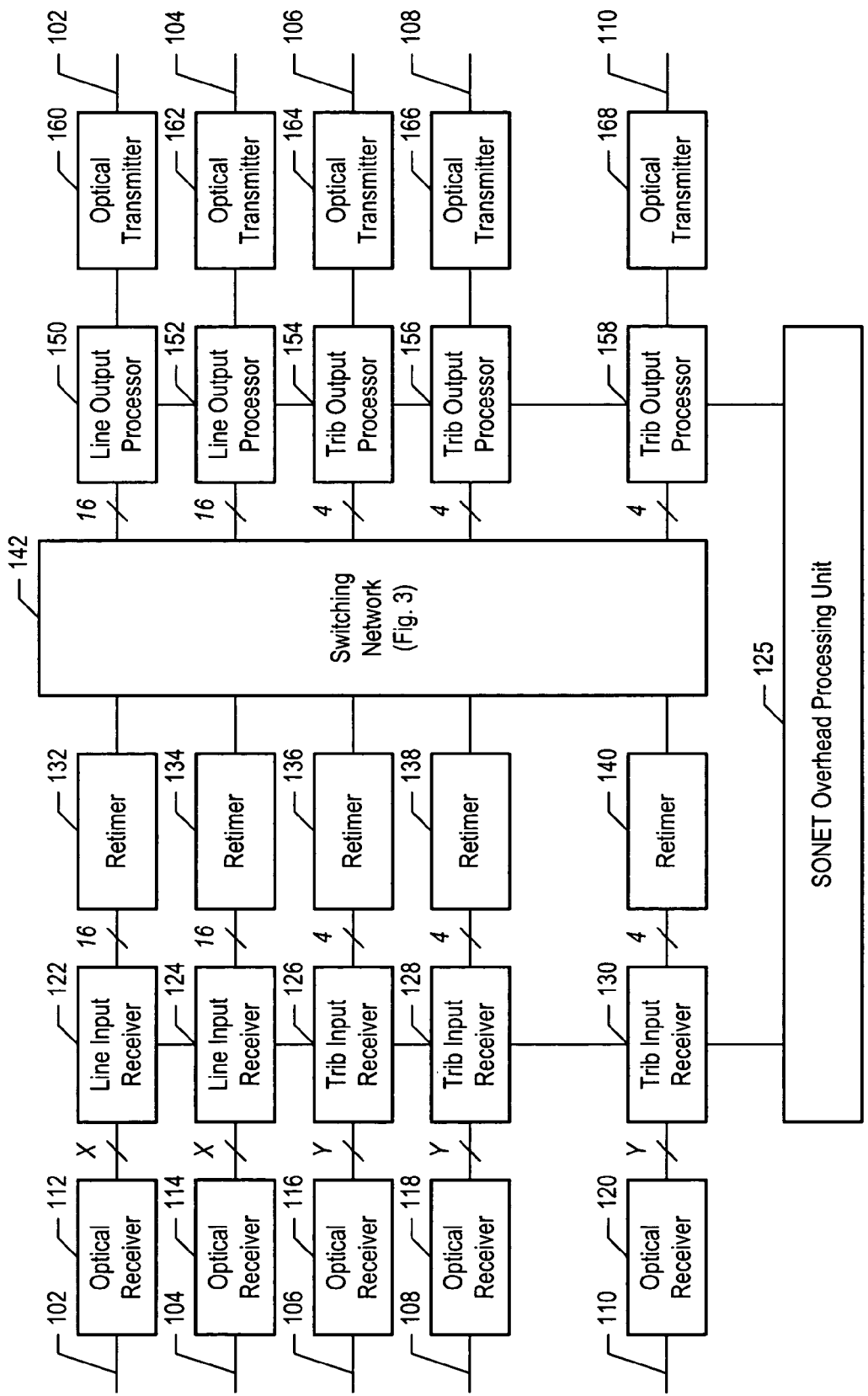
FIG. 1 illustrates a block diagram of an application of a switching network according to an exemplary embodiment of this invention in the context of a SONET add/drop multiplexer.

FIG. 1 is a block diagram of an add/drop multiplexer 100 for use in a SONET node illustrating a switching network in an exemplary embodiment of this invention. Add/drop multiplexer 100 receives two optical through lines 102 and 104, and 8 optical tributaries ("tribs"), represented by lines 106, 108 and 110. Through lines 102 and 104 generally connect nodes in a SONET ring, as is known in the art. Tribs 106, 108 and 110 are smaller bandwidth pipes that originate, terminate, or otherwise transfer a data stream on the SONET ring. In the block diagram of FIG. 1, lines 102, 104 and tribs 106, 108, 110 are connected to a plurality of optical receivers 112, 114, 116, 118 and 120. Optical receivers 112 and 114 receive optical signals from lines 102 and 104, respectively, and convert the data into the electrical domain, as is known in the art and defined in the SONET standard. Optical receivers 116, 118 and 110 receive optical signals from tribs 106, 108 and 120, respectively, and convert the data into the electrical domain, as is known in the art and defined in the SONET standard. In this exemplary embodiment, optical receivers 112, 114, 116, 118 and 120 concatenate signals into "lanes" of parallel data. The output of line optical receives 112 and 114 are X lanes wide, and the outputs of trib output receivers 116, 118 and 120 comprises Y lanes of data. In the exemplary embodiment of this invention, x=16 and y=4. Other configurations of input and output lanes will be apparent to one skilled in the art after studying this disclosure.

Line optical receivers 112 and 114 are each connected to a SONET line input processor 122 and 124, respectively, which removes the SONET overhead information and forwards it to a SONET overhead processing unit 125. SONET overhead processing unit 125 is also known in the art from the SONET standard, and thus not further discussed here.

Line optical receivers 116, 118 and 120 are connected to SONET trib input processors 126, 128 and 130, respectively. SONET trib processors 126, 128 and 130 also send overhead information from their respective tribs to SONET overhead processing unit 125. All line and trib input processors 122, 124, 126, 128 and 130 operate according to the SONET standard, do not comprise part of the invention claimed herein and thus will not be discussed further.

The outputs of line input processors 122 and 124 comprise 16 parallel data lanes in this exemplary embodiment, comprising one byte of data each. Further, the outputs of SONET trib input processors 126, 128 and 130 comprise 4 parallel lanes, in this exemplary embodiment, comprising one byte of data each. As a result, the output of all of the input processors 122, 124, 126, 128 and 130 (and those not shown) is 64 parallel data lanes. In SONET terminology, a "lane" generally equates to an STS-1.

All concurrent output lanes from line and trib input processors 122, 124, 126, 128 and 130 are fed into a respective retimer 132, 134, 136, 138 and 140. Retimers 132, 134, 136, 138 and 140 align all of the 64 lanes in time for processing in parallel by switching network 142, as will be described below. The functionality of retimers 132, 134, 136, 138 and 140 is also known in the art and described in the SONET standard and thus not further described herein. Switching network 142, switches all lanes in a space-time-space manner, wherein any lane may be switched to any other lane, thus providing a complete cross-connect in one switching network 142, as will be described further, below.

The output of switching network 142 comprises 64 parallel lanes, which are delivered to output processors. 16 lanes are delivered to each of a SONET line output processor 150, 152. 4 lanes are delivered to each of a SONET trib output processor, represented by output processors 154, 156 and 158. SONET line and trib output processors 150, 152, 154, 156 and 158 receive overhead data from SONET overheard processing unit 125. Line output processors 150 and 152 deliver their output to electrical-to-optical converters 160 and 162, which serialize the data and transmits it on optical lines 102 and 104, respectively. Trib output processors 154, 156 and 158 deliver their output to electrical-to-optical converters 162, 164 and 166, respectively, which serialize the data and transmits it on optical lines 106, 108 and 110, respectively.

Figure 2:
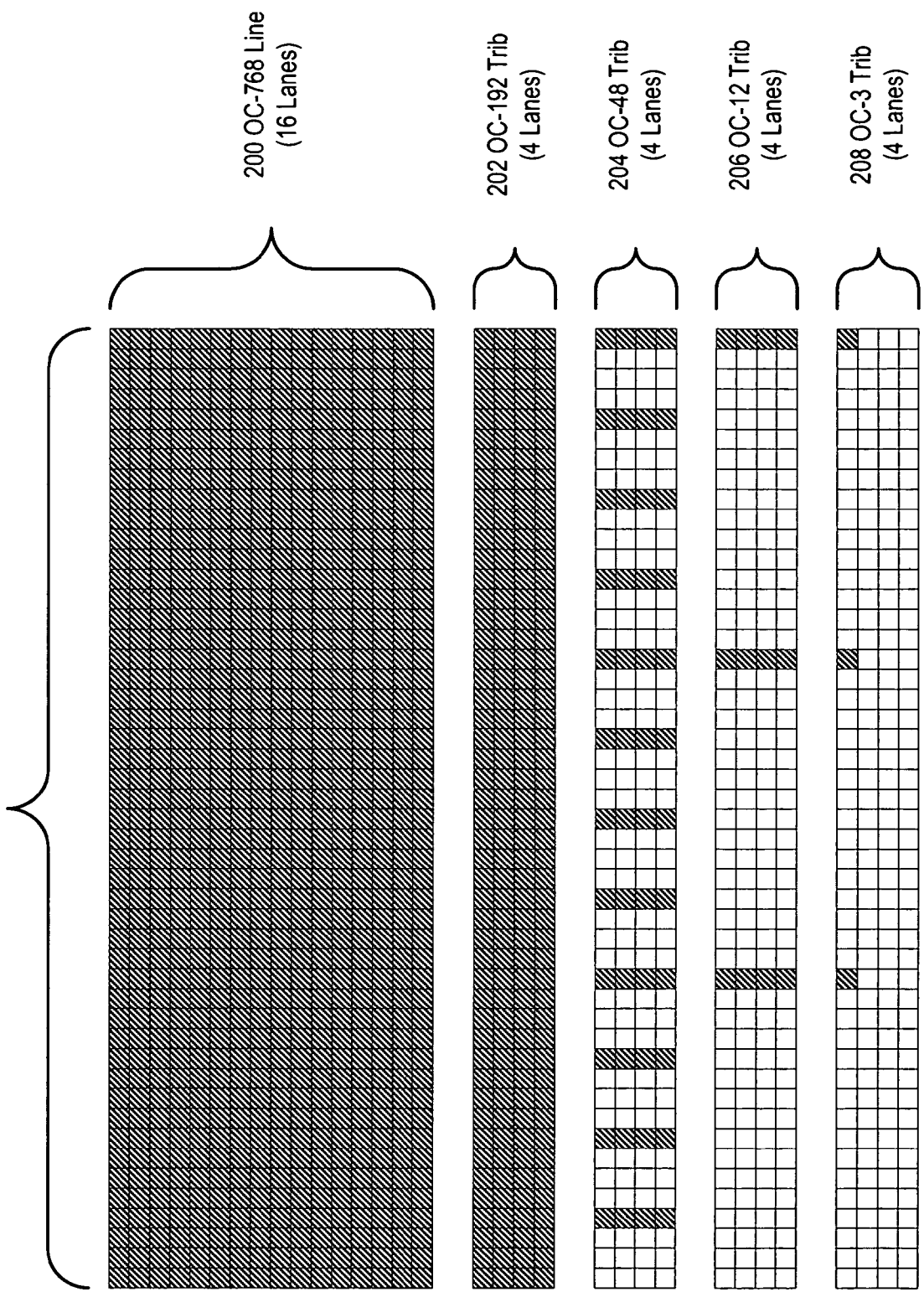
FIG. 2 is a block diagram of an arrangement of input time slots and lanes for a line supporting OC-768 and tribs supporting OC-192, OC-48, OC-12 and OC-3 according to an exemplary embodiment of this invention.

FIG. 2 is a set of block diagrams of lanes and time slots for data at the SONET rate of OC-768 as input to switching network 142, according to one exemplary embodiment of this invention. Each shaded block represents a potentially occupied data block. At this input rate, switching network 142 is clocked at 311 MHz. The inputs may be a combination of two lines 200 and 8 tribs 202, 204, 206 or 208. Line input 200 comprises an OC-768 having 16 lanes of data by 48 time slots. Trib input 202 illustrates an OC-192 input comprising 4 lanes of 48 time slots. Trib input 204 represents an OC-48 input comprising 4 lanes. One out of every four of the 48 time slots contain data. Trib input 206 represents an OC-12 input comprising 4 lanes. One out of every 16 time slots contain data, 4 lanes wide. Trib input 208 represents an OC-3 input comprising 4 lanes. One out of every 16 time slots contain data in one lane.

Figure 3:
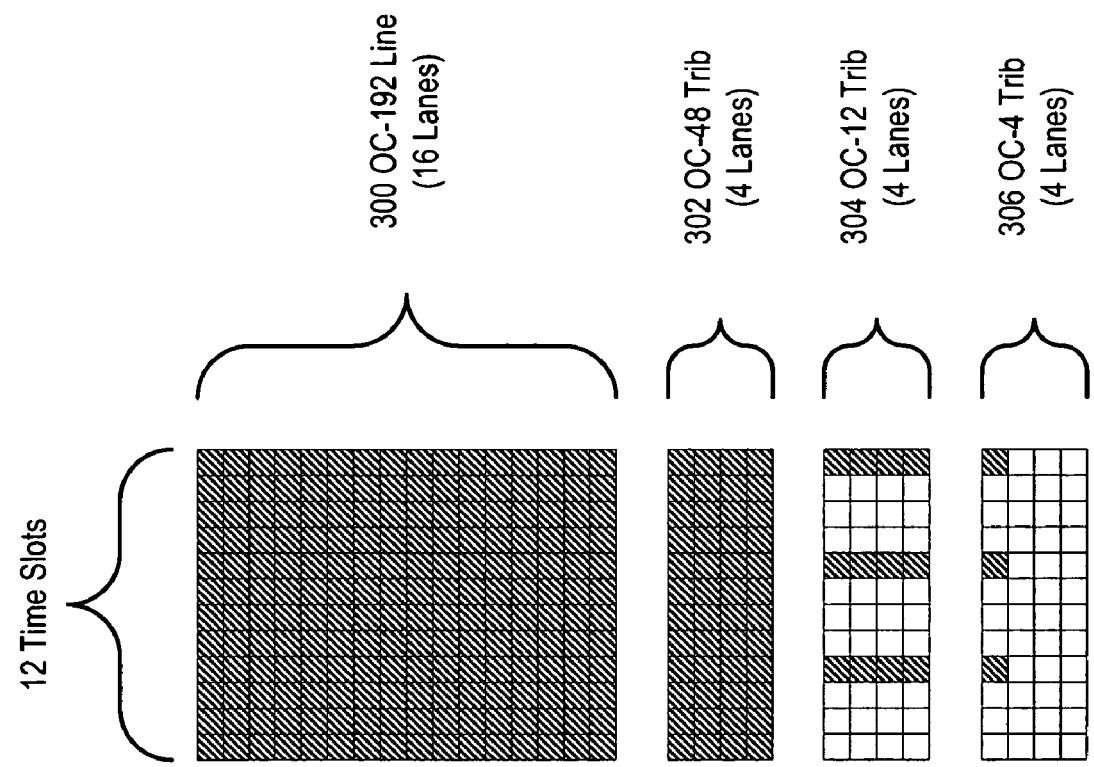
FIG. 3 is a block diagram of an arrangement of input time slots and lanes for a line supporting OC-192 and tribs supporting OC-48, OC-12 and OC-3 according to an exemplary embodiment of this invention.

FIG. 3 is a set of block diagrams of lanes and time slots for data at the SONET rate of OC-192 as input to switching network 142, according to another exemplary embodiment of this invention. As in FIG. 2, each shaded block represents a potentially occupied data block. At the line input rate of OC-192, switching network 142 is clocked at 78 MHz. At this rate, the inputs may be a combination of two lines and 8 tribs, in any combination of the tribs. Line input 300 illustrates and OC-192 lines comprises 16 lanes of data by 12 time slots. Trib input 302 illustrates an OC-48 input comprising 4 lanes of 12 time slots. Trib input 304 represents an OC-12 input comprising 4 lanes. One time slot out of every four of the 48 time slots contains data. Trib input 306 represents an OC-3 input comprising 4 lanes. One lane and time slot out of every 16 time slots contain data.

Figure 4:
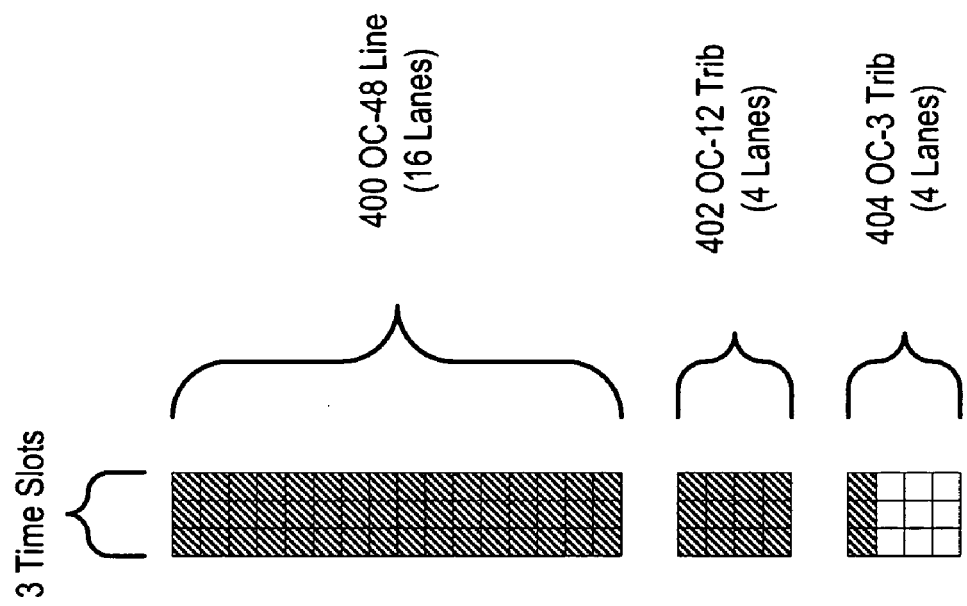
FIG. 4 is a block diagram of an arrangement of input time slots and lanes for a line supporting OC-48 and tribs supporting OC-12 and OC-3 according to an exemplary embodiment of this invention.

FIG. 4 is a set of block diagrams of lanes and time slots for data at the SONET line rate of OC-48 as input to switching network 142, according to another exemplary embodiment of this invention. At the OC-48 rate, switching network 142 is clocked at 19 MHz. At this rate, the inputs may be a combination of two lines and 8 tribs. Line input 400 comprises 16 lanes of data by 3 time slots. Trib input 402 illustrates an OC-12 input comprising 4 lanes of 3 time slots. Trib input 208 represents an OC-3 input comprising one lane of data and 3 time slots.

Figure 5:
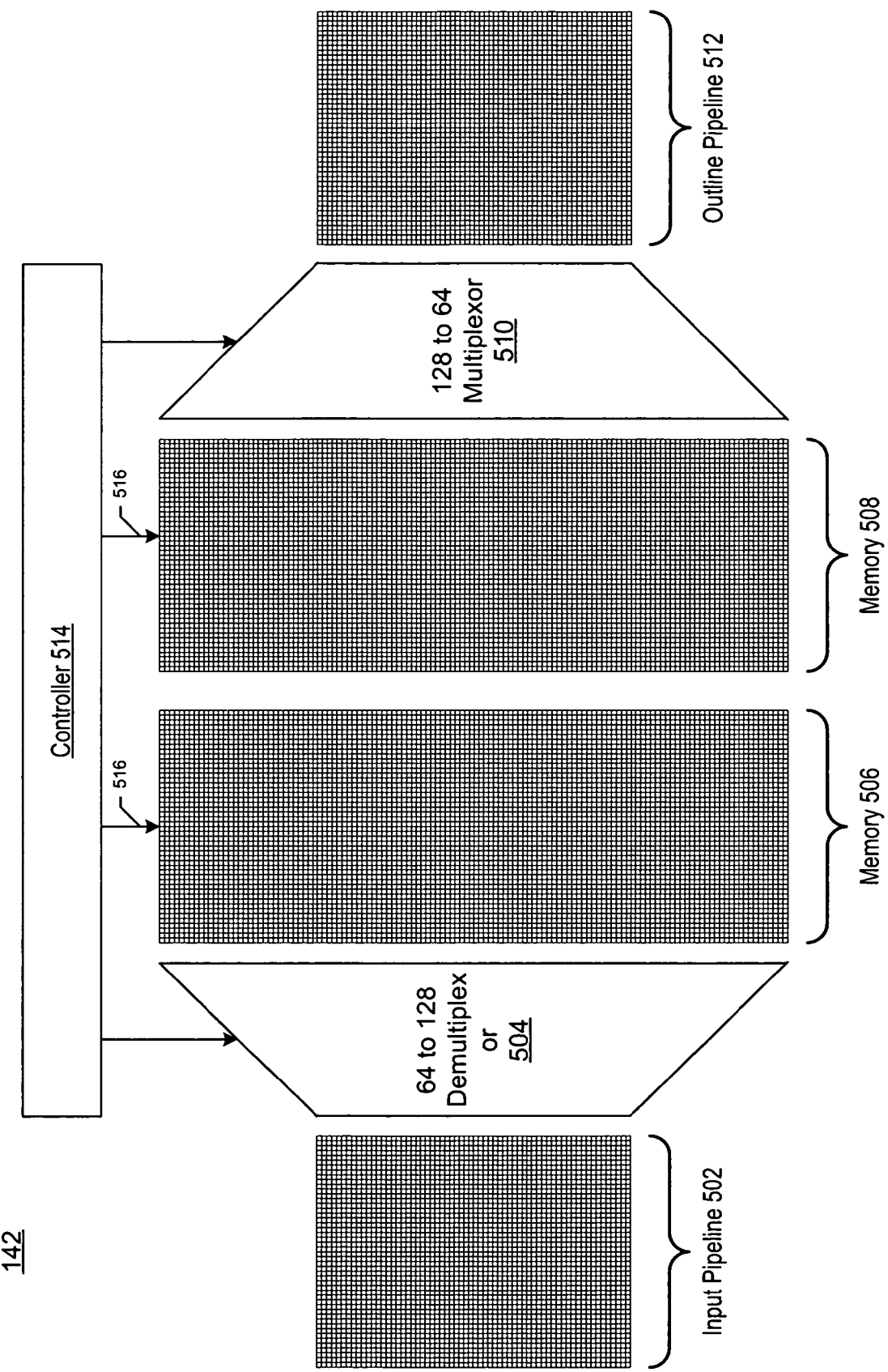
FIG. 5 is a block diagram of a switching network according to an exemplary embodiment of this invention.

FIG. 5 is a block diagram of a switching network 142 according to an exemplary embodiment of this invention. Switching network 142 comprises input pipeline 502, a demultiplexer 504, a first memory 506, a second memory 508, a multiplexer 510, and output pipeline 512. A controller 514 controls the connections within the demultiplexer 504 and multiplexer 510, and read pointers 516 and 518 into memories 506 and 508, respectively. Input 502 is illustrated as a pipeline array, comprising x rows by y columns. In the exemplary embodiment, x is 64 and y is 48. Each row is one lane, as defined above. Each column is one time slot. The data in this exemplary embodiment comprises a byte (8 bits). Therefore, there are 64 bytes being switched in parallel in this example. One skilled in the art will be able to scale this example to more or less parallel switching after studying this disclosure. Pipelines are used in this illustration as inputs 502 and outputs 512, but other types of inputs and outputs may be devised by those skilled in the art after studying this disclosure.

The y dimension of input array 502 comprises a plurality of time slots. In this exemplary embodiment, therefore, there are 48 clock cycles for each cycle through the switching network 142. One cycle through switching network 142 is generally called a "frame", in the art, and will thus be used here. Again, one skilled in the art will be able to scale this example to a specific application after studying this disclosure.

Demultiplexer 504 is connected to input pipeline 504 to receive one column in parallel, and switch the data in parallel into one of memories 506 or 508 during one clock cycle, as will be explained further, below. Memories 506 and 508 each comprises a 128 by 48 array of memory blocks of sufficient size to hold the data. Of course, registers or other forms of data storage may be used. Applicants have determined that a two to one ratio of memory blocks to inputs is sufficient to permit demultiplexer 504 to be non-blocking. Therefore, demultiplexer 504 comprises a 64 to 128 demultiplexer network.

In operation, controller 514 configures demultiplexer 504 for the optimal routing of one column of input 504 into one of the first memory 506 or the second memory 508. Thus, during the first clock cycle, the first column of data are routed through the demultiplexer 504 and stored in the first column of one of the memories 506 or 508. The data in input pipeline 502 moves forward one column. During the second clock cycle, controller 514 reconfigures demultiplexer 504 and the second column of input 504 is routed into the second column of memory 506 or 508. During each succeeding clock cycle, controller 514 causes demultiplexer 504 to reconfigure and move each y column into the corresponding y column of memory 506 or 508, while sorting in the x dimension. When all 48 columns have been sorted, memory 506 or 508 is full and a frame is complete. As is clear from the above description, demultiplexer 504 may change the relative x position of data within a y row, as is known in the art, and therefore comprises a space switch.

Continuing with FIG. 5, memories 506 and 508 are connected to an output pipeline 512 by a multiplexer 510. Multiplexer 510 comprises, in this exemplary embodiment, a 128 to 64 multiplexer. Output pipeline 512 is illustrated as 48 by 64 array, in the same manner as input pipeline 504.

In operation, controller 514 operates multiplexer 510 to empty memory 506 or 508 that previously has been filled by demultiplexer 504. Controller 514 causes data in any row or column of memory 506 or 508 to be routed to a row in a specified column in output pipeline 512. Thus, a read pointer 516 or 518 from controller 514 may point to any row or column during a clock cycle, and also sets multiplexer 510 to cause that data to flow to a selected row and column (selected by the time slot within the frame) in output 512. The second stage of switching network is a combined time and space switch, in that time slots may be interchanged by selecting a read column and the multiplexer 510 may switch the row number.

A constraint imposed by the exemplary embodiment is that, given the current construction of memories, only one read may occur per row per clock cycle. Therefore, controller 514 must ensure that no two data items that are destined for the same column in output 512 are in the same row in memory 506 or 508. One skilled in the art may readily comprehend that other intermediate storage buffers may not be so limited after a study of this specification.

Two memories 506 and 508 are used in this exemplary embodiment to facilitate speed through the two stages. As one memory, for example, memory 506, is being filled by demultiplexer 504, memory 508 may be emptied by multiplexer 510. In this manner, only two frames are required to switch data through the equivalent of a space-time-space switch, which in most instances in the prior art takes at least three frames. Memories 506 and 508 may be one large memory, as in the exemplary embodiment of this invention, or may be separate memory or registers.

Further, memories 506 and 508 may be 2y by x and achieve the same or similar results. The time and space-time stages may also be reversed, by placing the buffer in the input. Such variations will be apparent to those skilled in the art after studying this disclosure, and are intended to be covered by the attached claims.

The SONET standard specifies the organization of data within each SONET frame. It is known in the art that the SONET format accommodates payloads of varying sizes. Network services from STS-1 (51.480 Mb/s) to the entire bandwidth of the lane, STS-768, can be accommodated. The position of each STS-N in each frame is specified in the SONET standard. Therefore, since the incoming lines and tribs are known, the controller 514 calculates the STS's that are to be moved from one stream to another. Furthermore, since the time slots are timed in retimers 132, 134, 136, 138 and 140 to coincide such that, when all 64 lanes are fed into input 502, controller 514 can move STS's around from lines to tribs, tribs to lines, tribs to tribs, through lines or tribs, etc. Thus, in two frames, the switching network 142 of this invention can add, drop or through put any defined SONET data stream. The following Figure's illustrate this invention.

Turning now to FIGS. 6 to 14, three frames of data flowing through an exemplary embodiment of this invention are shown, in simplified form. FIGS. 6 to 14 illustrate a 4x by 3y pipeline input 502 and a 4x by 3y pipeline output 512. Further, memories 506 and 508 are illustrated as each being 8x by 3y. These dimensions were selected for brevity and clarity of this description. Each datum is represented by one of the string of letters A to G. "X's" represent null data. Each FIGS. 6 to 14 represents one clock cycle. In this example, lane 1 comprises a line and lane 2 comprises a trib. Further, data represented by the letter "D" is to be dropped into the trib lane 2 and the data represented by the letter "B" is to be added into the line, lane 1. Lanes 3 and 4 are "hairpinned", as is known in the art. That is, the data from land 3 is to move to lane 4. As in any pipelined system, pipeline input 502 and pipeline output 512 move data forward (from the left to the right in the FIG's.) one position each clock cycle.

Figure 6:
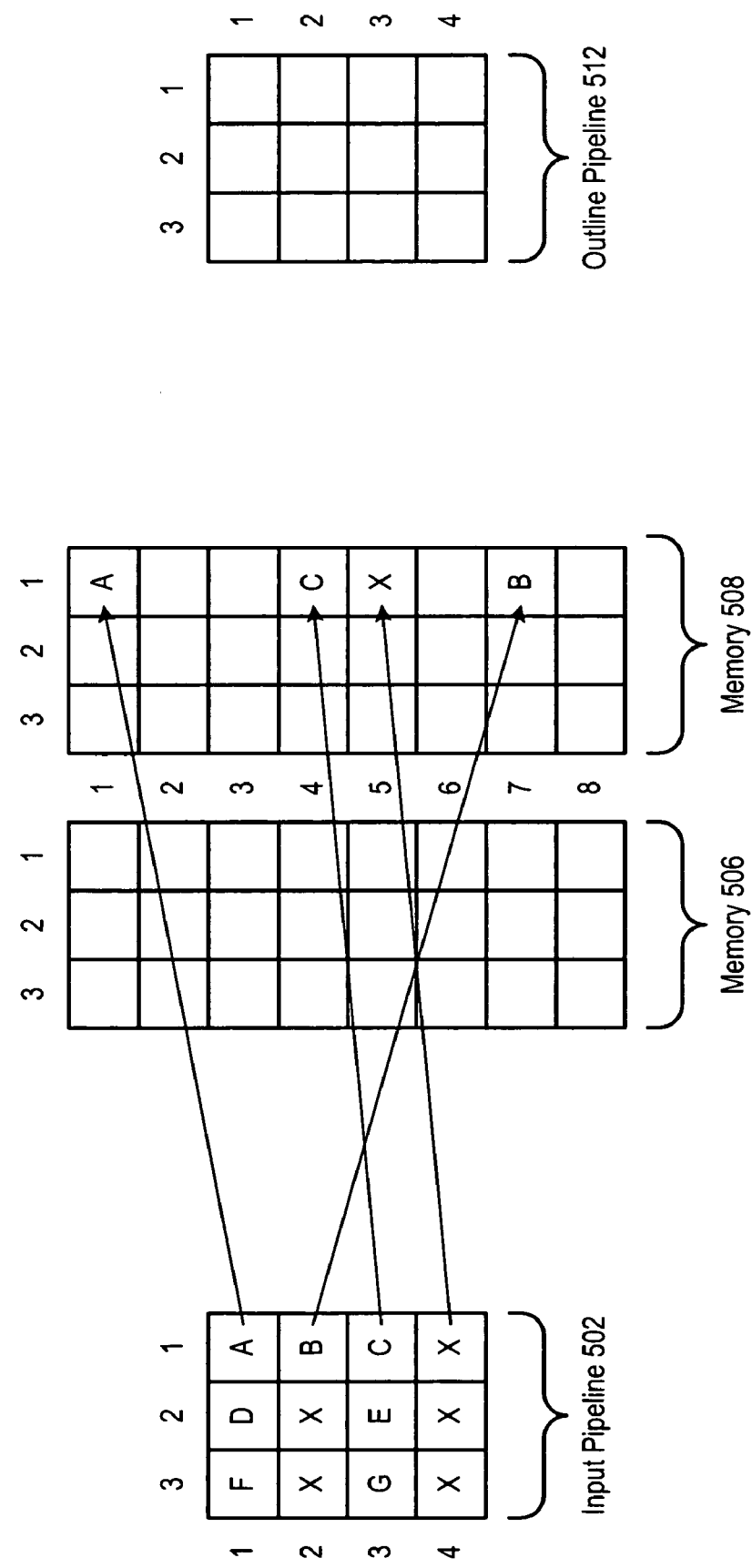
FIGS. 6 to 8 are block diagrams of the operations of the switching network of FIG. 5 during a first frame.
Figure 7:
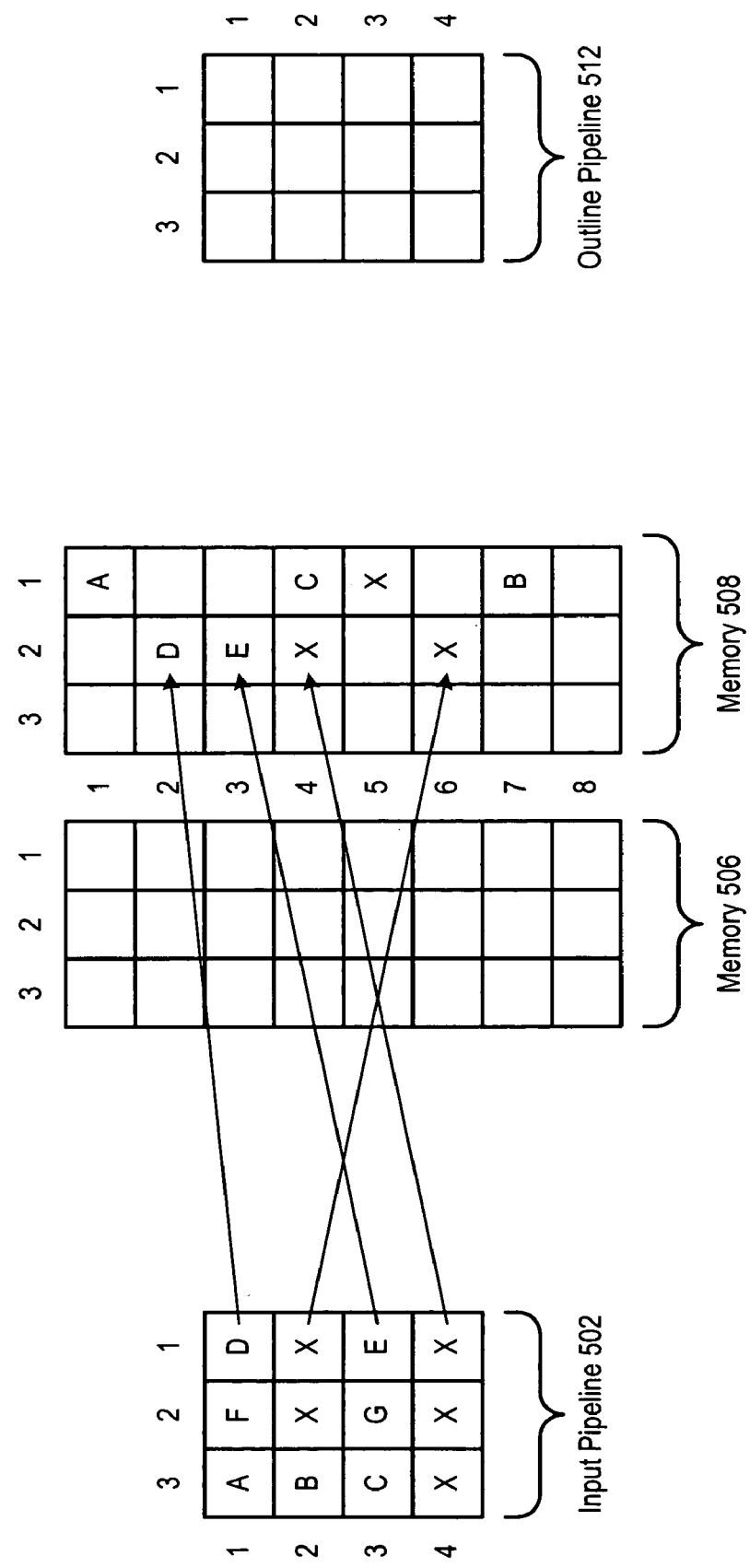

Turning to FIG. 6, the actions during a first clock cycle of a first frame are illustrated. A determination is made by the controller 214 which datum in the first column of input pipeline 502 is delivered to which row in the first column of memory 508. Demultiplexer 504 is set to make the proper connections. The data item represented by the letter "A" is delivered from row 1, column 1 of the input to row 1, column 1 of the output. "B", column 1, row 2 is delivered to row 7, column 1 and C, row 3, flows to row 4. Finally, X, row 4 of the input, flows to row 5 of the memory. All letters stored in memory are denoted in Italics in the Figures FIG. 7 illustrates a second clock cycle of the first frame. Controller 214 selected paths through the demultiplexer 504 for the next column of data from input pipeline 502. D moves from row 1 to column 2, row 2, X moves to column 2 row 6, E moves to column 2, row 3 and X moves to column 2 row 4.

Figure 8:
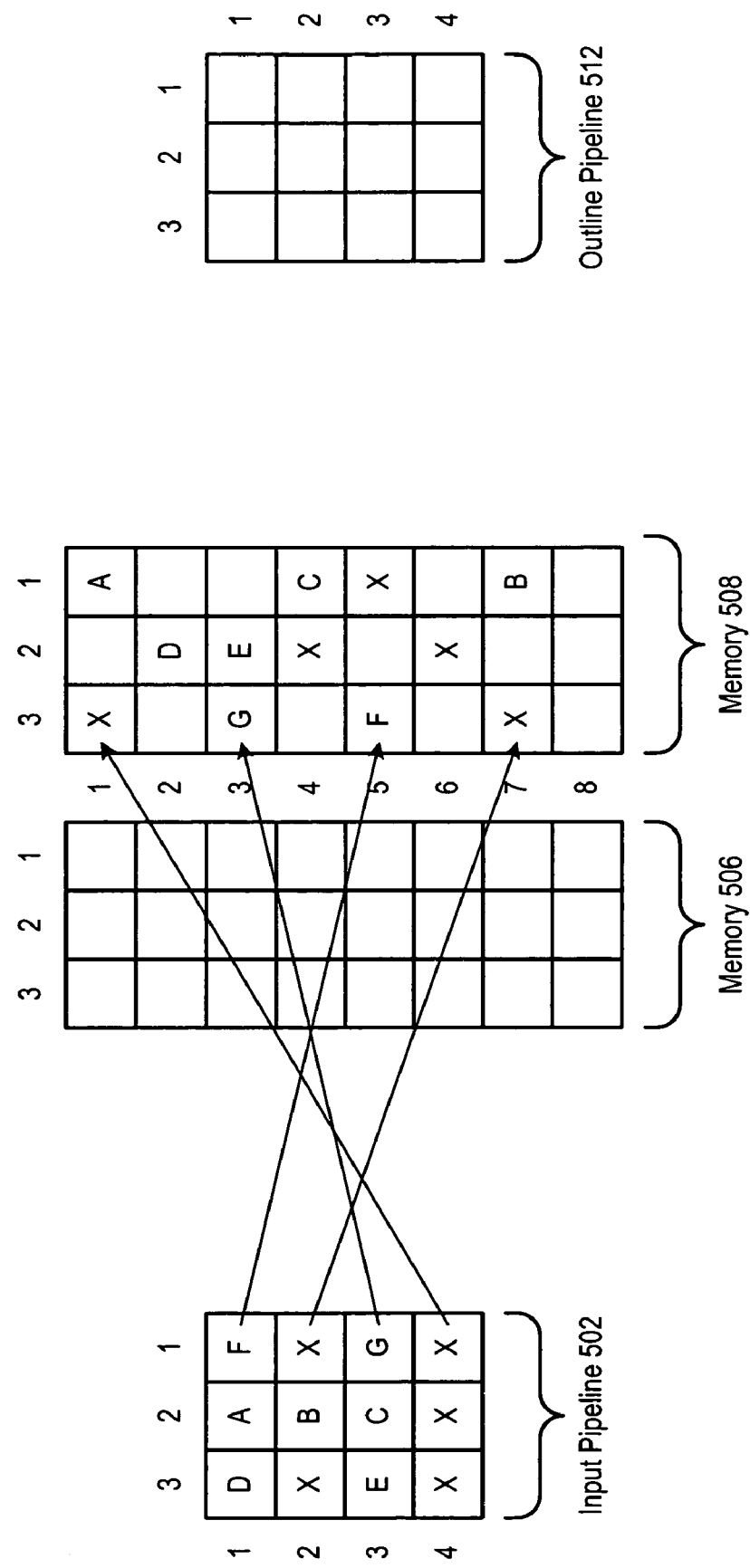

FIG. 8 illustrates a third (and last) clock cycle of the first frame. Controller 514 selects paths through demultiplexer 504 for data from the third column of input pipeline 502. F is moved to column 3, row 5, X is moved to column 3, row 7, G is moved to column 3, row 3, and finally X is moved to column 3, row 1. At this point, a frame comprising three clock cycles is complete.

Figure 9:
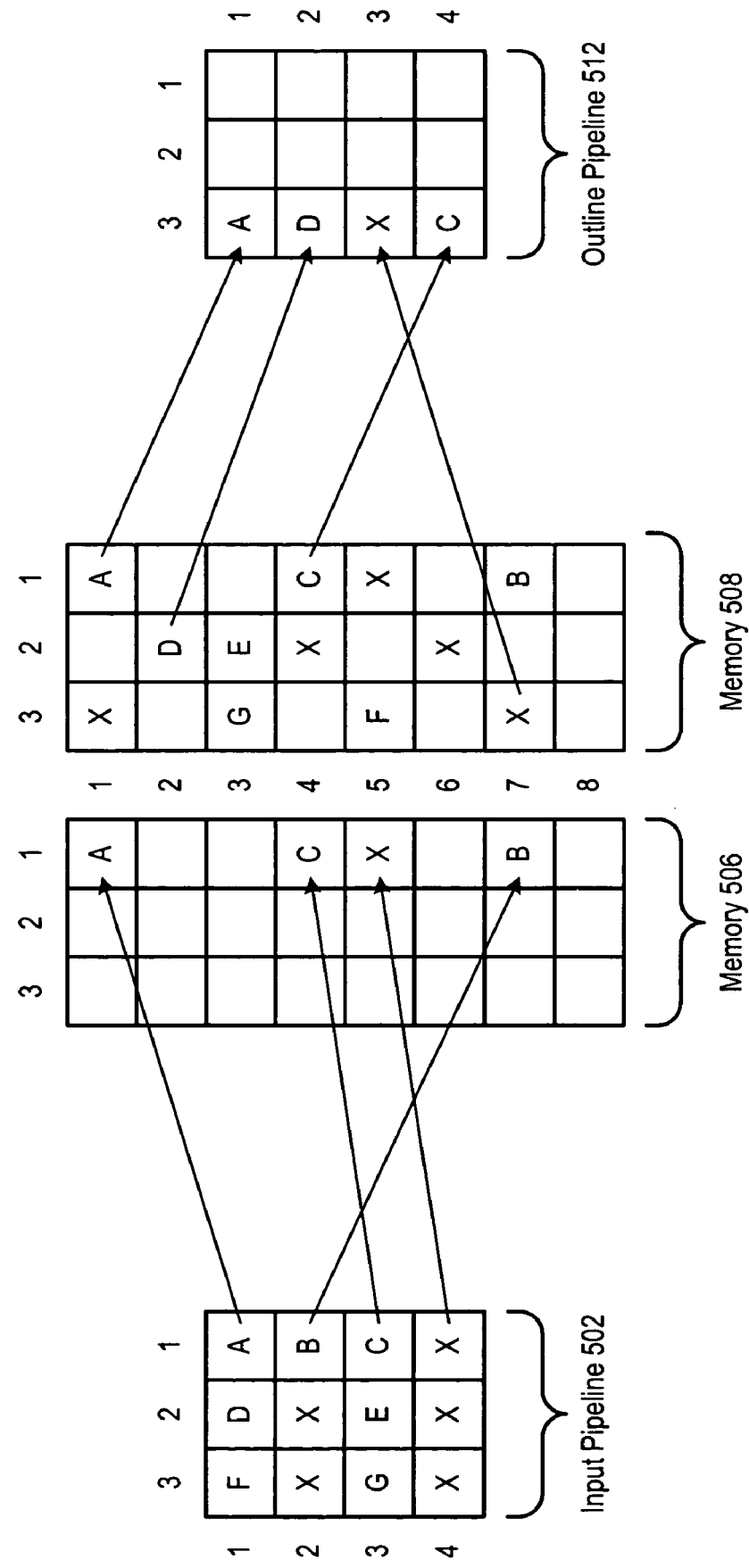
FIGS. 9 to 11 are block diagrams of the operations of the switching network of FIG. 5 during a second frame.

FIG. 9 illustrates the first clock cycle of the second frame. Two sets of operations occur during this clock cycle. Input pipeline 502 appears the same as it did at the beginning of the first clock cycle, because the data (in the normal case) does not change input or output. However, memory 508 is holding the data moved in the first frame, therefore the data from the input pipeline 502 during the second frame is moved into memory 506. Thus, A moves to column 1, row 1, B moves to column 1, row 7, C moves to column 1 row 4 and X moves to column 1, row 5 of memory 506. Simultaneously, controller 514 sets the read pointer 518 into memory 508 and sets the data paths through multiplexer 510 to deliver the data in the proper space and time order to output pipeline 512. In this step, any row and any column can be moved into any column during one clock cycle (time and space switching). A moves from column 1, row 1 to column 3, row 1 of the output. D moves from column 2, row 2 of memory 508 to column 3, row 2 of the output pipeline 512. X moves from column 3, row 7 of memory 508 to column 3, row 3 of the output. C moves from column 1, row 4 of memory 508 to column 3, row 4 of the output.

Figure 10:
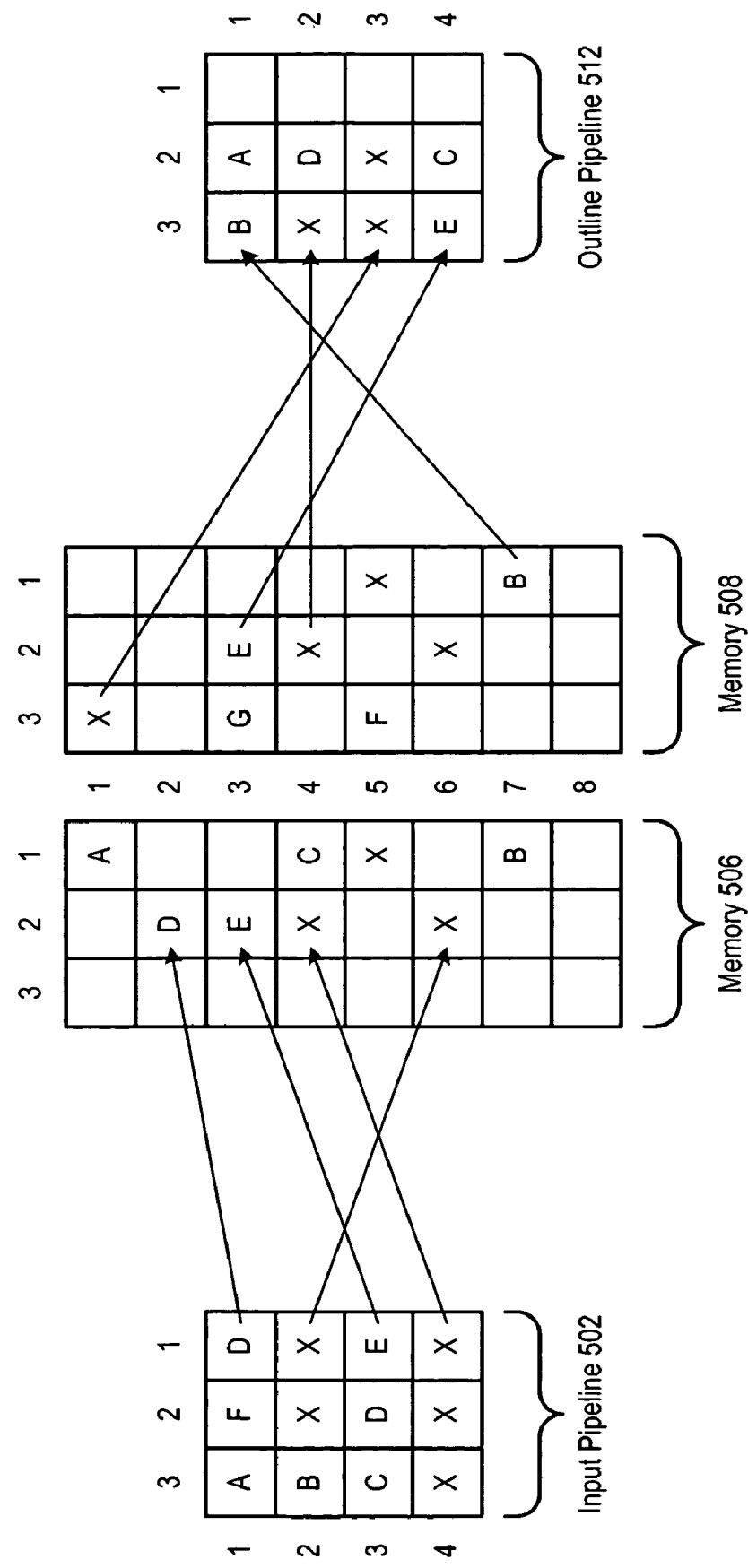

FIG. 10 illustrates the second clock cycle of the second frame. Controller 514 selected paths through demultiplexer 504 for the next column of rows from input pipeline 502. D moves from row 1 column 1 to row 2 column 2 of memory 506. X moves to column 2 row 6 of memory 506. E moves to column 2, row 3 and X moves to column 2 row 4 of memory 506. Simultaneously, controller 214 selects read pointer 518 and paths through multiplexer 510 for the next column of outputs. B moves from column 1 of memory 508 to column 3, row 1 of output 512. X moves from column 2, row 4 of memory 508 to column 3, row 2 of the output 512. X moves from column 3, row 1 of memory 508 to column 3, row 3 of output 512. E moves from column 2, row 3 of memory 508 to column 3, row 4 of output pipeline 512.

Figure 11:
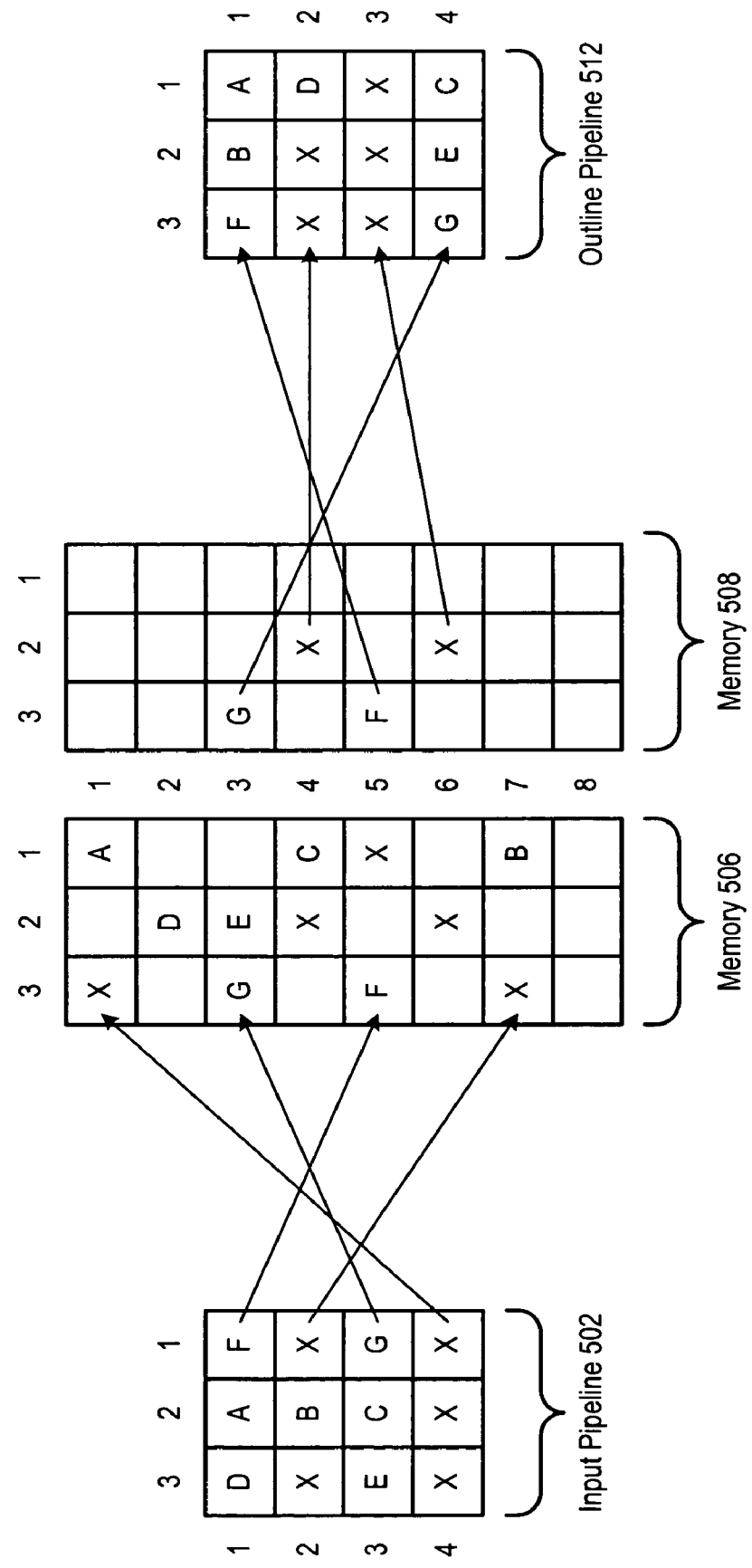

FIG. 11 illustrates the third clock cycle of the second frame. Controller 514 selects paths through demultiplexer 504 for data from the third column of input pipeline 502. F is moved to column 3, row 5, X is moved to column 3, row 7, G is moved to column 3, row 3, and finally X is moved to column 3, row 1 of memory 506. Simultaneously, F moves from column 3, row 5 of memory 508 to column 3, row 1 of the output. X moves from column 2, row 4 of memory 508 to column 3, row 2 of the output. X moves from column 2, row 6 of memory 508 to column 3, row 3 of output 512. G moves from column 3, row 2 of memory 508 to column 3, row 4 of output pipeline 512. These actions complete a second frame.

Figure 12:
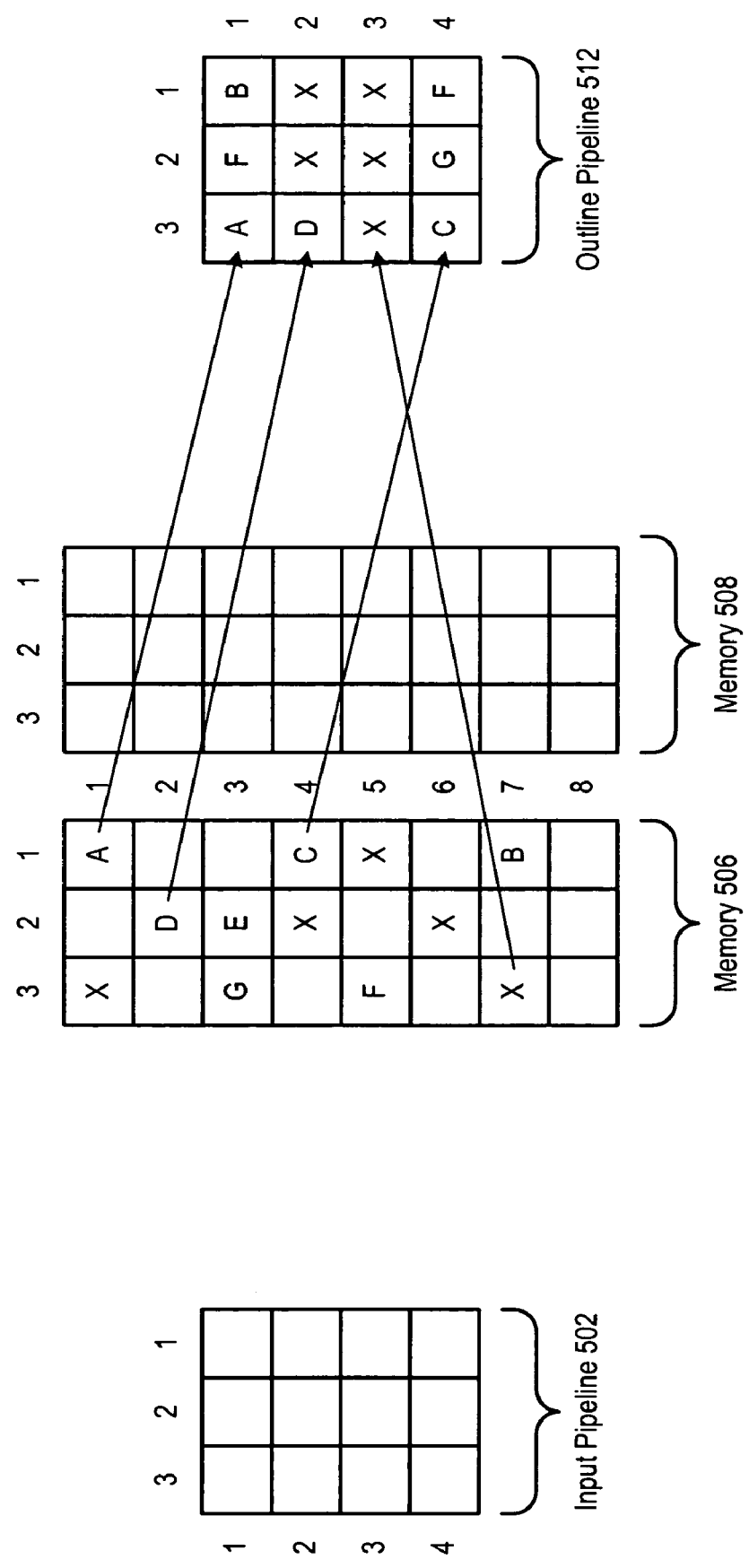
FIGS. 12 to 14 are block diagrams of the operations of the switching network of FIG. 5 during a third frame.
Figure 13:
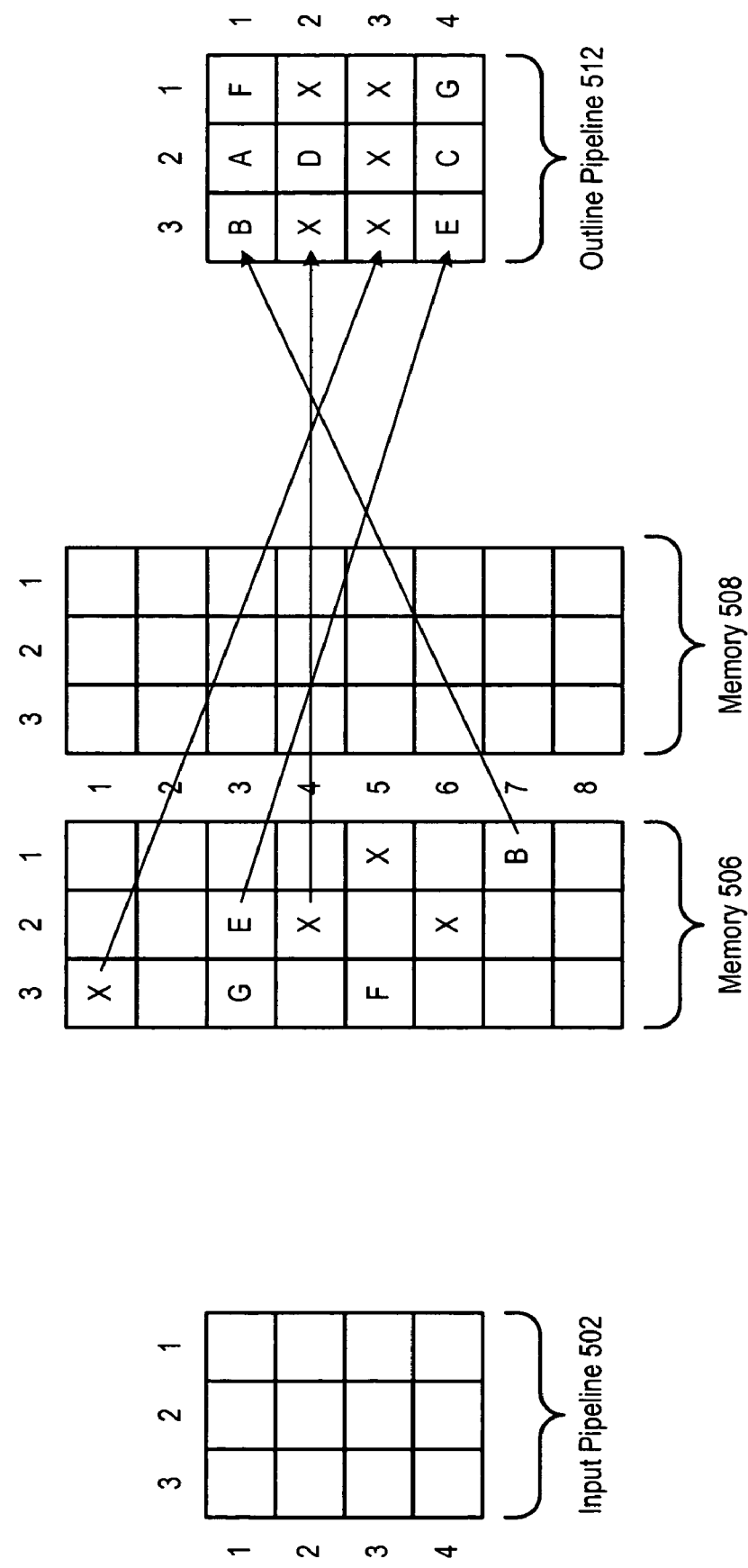
Figure 14:
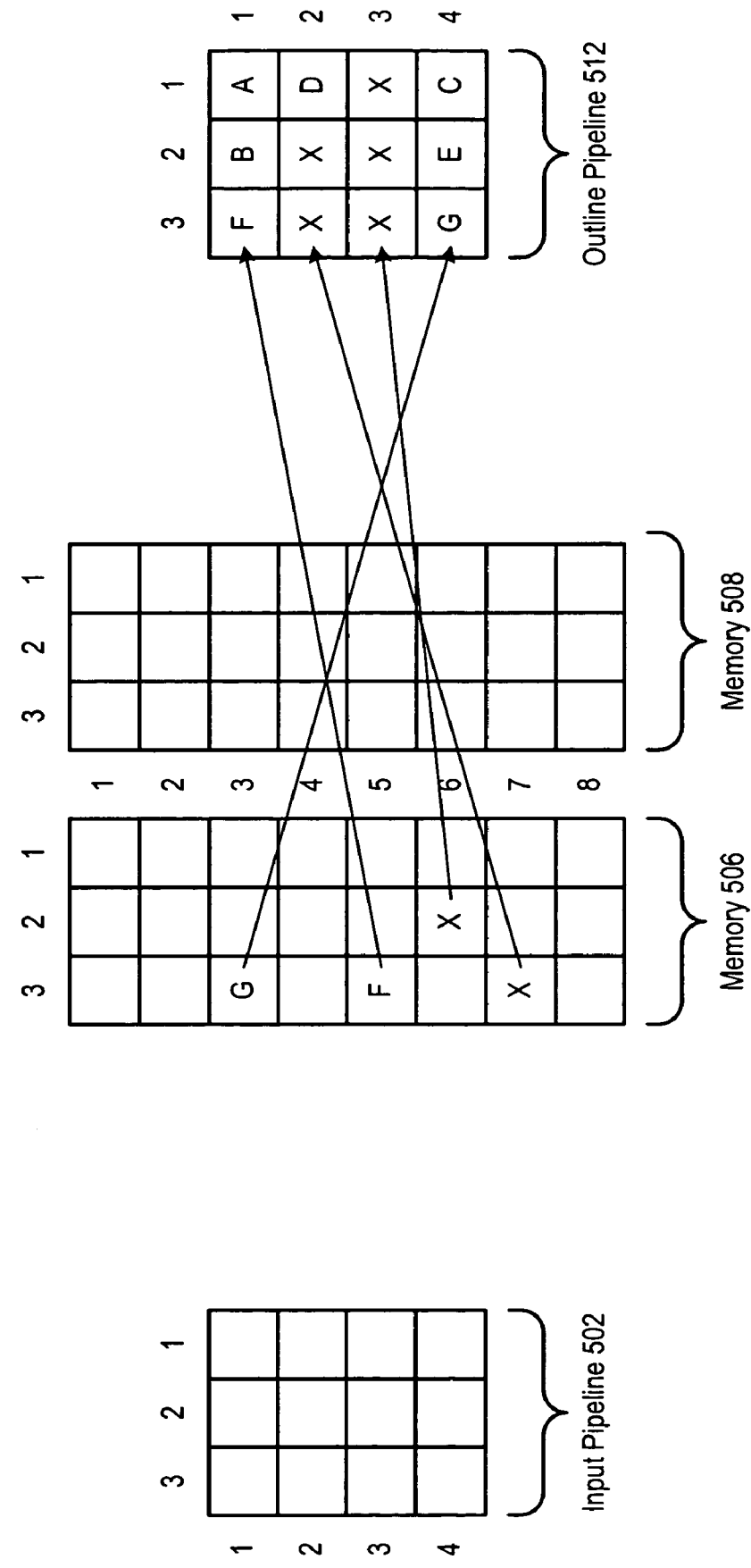

FIGS. 12 to 14 illustrate a third frame wherein the data is moved from memory 506 to the output. During this frame, data is moved from input pipeline 502 to memory 508 as described above, but will not be shown here for the sake of clarity and brevity. FIG. 12 illustrates the first clock cycle of the third frame. Controller 514 sets read pointer 516 into memory 506 and sets the data paths through multiplexer 510 to deliver the data in the proper space and time order to output pipeline 512. In this step, any row and any column can be moved into any column during one clock cycle (time and space switching). A moves from column 1, row 1 of memory 506 to column 3, row 1 of the output pipeline 512. D moves from column 2, row 2 of memory 506 to column 3, row 2 of output. pipeline 512. X moves from column 3, row 7 of memory 506 to column 3, row 3 of the output. C moves from column 1, row 4 of memory 506 to column 3, row 4 of output pipeline 512.

FIG. 13 illustrates the second clock cycle of the third frame. Controller 514 selects read pointer 516 and paths through multiplexer 504 for the next column of outputs. B moves from column 1, row 7 of memory 506 to column 3, row 1 of output pipeline 512. X moves from column 2, row 4 of memory 506 to column 3, row 2 of output pipeline 512. X moves from column 3, row 1 of memory 506 to column 3, row 3 of output pipeline 512. E moves from column 2, row 3 of memory 506 to column 3, row 4 of output pipeline 512.

FIG. 14 illustrates the third clock cycle of the third frame. F moves from column 3, row 5 of memory 506 to column 3, row 1 of output pipeline 512. X moves from column 3, row 7 of memory 506 to column 3, row 2 of the output. X moves from column 2, row 6 of memory 506 to column 3, row 3 of output pipeline 512. G moves from column 3, row 3 of memory 506 to column 3, row 4 of output pipeline 512. These actions complete the third frame.

Figure 15:
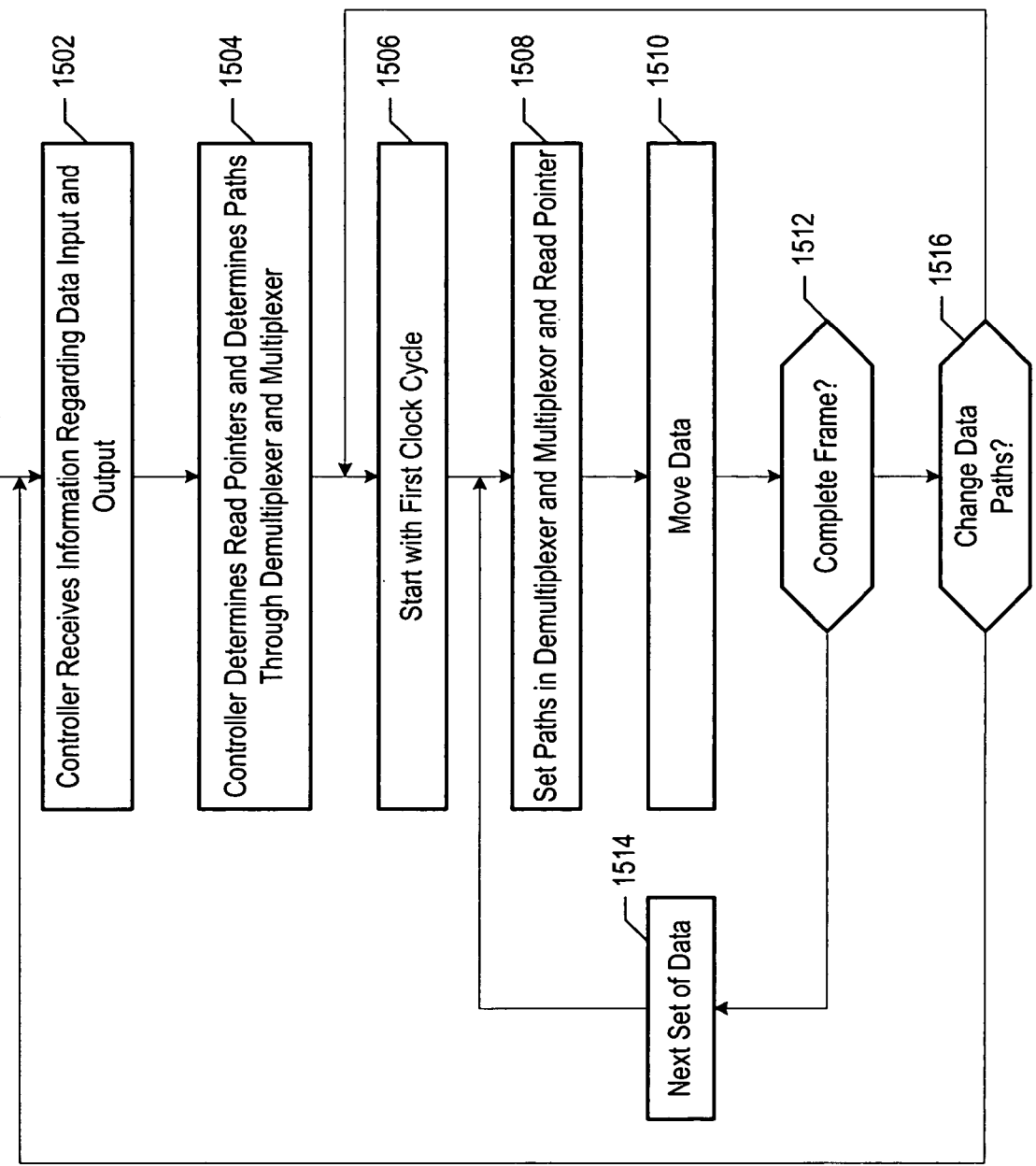
FIG. 15 is a flow chart of operations performed by the controller of the switching network of FIG. 5.

FIG. 15 is a flowchart of processing in controller 514. Processing begins in circle 1500 and moves to action box 1502 wherein the controller receives from a master controller (not shown but well known in the art) the components of the incoming lanes and the outgoing lanes. The controller calculates a route through the switching network that provides each time slot presented on each clock cycle at the input with a non-blocking path through the switching network. If time slot interchanging is necessary, that is also determined.

Once the calculations are made, processing proceeds to action box 1504 wherein the controller starts with the data out for the first clock cycle of the frame (box 1505). In the next action box (1508), the demultiplexer, multiplexer and the read pointers are set, and then in action box 1510 the data is moved. A determination is made in decision diamond 1512 whether this was the last clock cycle for this frame. If not, processing moves to action box 1514 wherein the next set of data is loaded and processing returns to action box 1508.

If, in decision diamond 1512, a determination was made that a frame was completed, then processing moves to decision diamond 1516, where a decision is made whether there is a change in data paths. If not, then processing loops back to action box 1506. If there has been a change in data paths, then processing loops back to action box 1502, wherein the controller receives and calculates a new set of control data for the switching network.

It is to be understood that the above-described embodiment is merely an illustrative principle of the invention and that many variations may be devised by those skilled in the art without departing from the scope of this invention. It is, therefore, intended that such variations be included within the scope of the following claims.

What is claimed is:

1. A switching network comprising:
a first memory comprising 2x rows and y columns;
a second memory comprising 2x rows and y columns;
an x-to-2x demultiplexer configured to receive a first array of signals that comprises x rows of signals and y columns of signals and to switch, during a first stage, the signals only within each column of said first array to form a second array of signals in one of the first and second memories; and
a 2x-to-x multiplexer configured to switch, during a second stage, the signals in said second array within both rows and columns to generate a third array of signals;
wherein x and y are both positive integers greater than 1; and
wherein to accomplish the switching;
the x-to-2x demultiplexer writes into the first memory while the 2x-to-x multiplexer reads from the second memory, and
the x-to-2x demultiplexer writes into the second memory while the 2x-to-x multiplexer reads from the first memory.

2. The switching network in accordance with claim 1 further comprising a controller configured to generate write pointers for the demultiplexer and read pointers for the multiplexer.

3. The switching network in accordance with claim 1 wherein the demultiplexer is configured to simultaneously space switch signals from the same column of the first array in one clock cycle and wherein the multiplexer is configured to simultaneously time and space switch signals from different columns of the second array into an entire column of the third array in one clock cycle.

4. The switching network in accordance with claim 1 further including a cyclical clock, wherein during said first stage said first array is written to one of the first and second memories in y clock cycles and wherein during said second stage said second array is read in y clock cycles from whichever of the first and second memories the first array was written to during the first stage.

5. The switching network in accordance with claim 4 wherein signals from the same column only are switched by the x-to-2x demultiplexer in a single clock cycle and wherein signals from different columns and rows are switched by the 2x-to-x multiplexer in a single clock cycle.

6. A method comprising:
   receiving a first frame of signals at an input pipeline, the first frame of signals comprising x rows of signals and y columns of signals;
   switching, via an x-to-2x demultiplexer, the first frame of signals only within each column to form a second array, wherein the switching comprises storing the second array in one of a first and second memory, and
   switching, via a 2x-to-x multiplexer, the signals within said second array within both rows and columns to form a third array at an output pipeline, wherein the switching comprises reading the second array from one of the first and second memories;
   wherein a frame of signals is stored in the first memory while a different frame of signals is read from the second memory; and
   wherein a frame of signals is stored in the second memory while a different frame of signals is read from the first memory.

7. The method in accordance with claim 6 wherein the switching via the 2x-to-x multiplexer comprises reading signals from different columns and from different rows in the same clock cycle.

8. The method in accordance with claim 7 wherein a frame is completely switched by the x-to-2x demultiplexer in a first stage and completely switched by the 2x-to-x demultiplexer in a second stage.

9. The method in accordance with claim 8 wherein the second stage is consecutive to the first stage.

10. A method for switching data comprising:
    in a first clock cycle;
       space switching a first set of data and writing the space switched first set of data to a first memory; and
       time and space switching a second set of data that was previously written into a second memory and reading the second set of data out of said second memory;
    in a second clock cycle;
       space switching a third set of data and writing the space switched third set of data into the second memory; and
       time and spare switching the first set of data that was written to the first memory in the first clock cycle and reading the first set of data out of the first memory.

11. The method of claim 10 wherein the first clock cycle occurs during a first stage of a two-stage switching process and the second clock cycle occurs during a second stage of the two-stage switching process.

12. A method for switching data comprising:
    in a first clock cycle;
       time and space switching a first set of data and writing the time and space switched first set of data to a first memory; and
       space switching a second set of data that was previously written into a second memory and reading the second set of data out of said second memory;
    in a second clock cycle;
       time and space switching a third set of data and writing the time and space switched third set of data into the second memory; and
       space switching the first set of data that was written to the first memory in the first clock cycle and reading the first set of data out of the first memory.

13. The method of claim 12 wherein the first clock cycle occurs during a first stage of a two-stage switching process and the second clock cycle occurs during a second stage of the two-stage switching process.

14. A two-stage switching element comprising:
    an input pipeline of data on an input side of a two-stage switching element;
    an output pipeline of data on an output side of the two-stage switching element;
    a first memory capable of storing a frame of data;
    a second memory capable of storing a frame of data;
    a demultiplexer configured to switch data from the input pipeline to the first and second memories;
    a multiplexer configured to switch data from the first and second memories to the output pipeline;
    a controller in signal communication with both the demultiplexer and the multiplexer and configured to generate read and write pointers which:
    during a first stage, 1) cause the demultiplexer to space switch a first frame from the input pipeline to the first memory, and 2) cause the multiplexer to time and space switch a second frame from the second memory to the output pipeline; and
    during a second stage, 1) cause the demultiplexer to space switch a third frame from the input pipeline to the second memory, and 2) cause the multiplexer to time and space switch the first frame from the first memory to the output pipeline.

15. The two-stage switching element of claim 14 wherein a frame of data is completely switched through the two-stage switching element after the first and second stages.

16. The two-stage switching element of claim 15 wherein the multiplexer is configured to space and time switch data to the output pipeline simultaneously in a single clock cycle.

17. A two-stage switching element comprising:
    an input pipeline of data on an input side of a two-stage switching element;
    an output pipeline of data on an output side of the two-stage switching element;
    a first memory capable of storing a frame of data;
    a second memory capable of storing a frame of data;
    a demultiplexer configured to switch data from the input pipeline to the first and second memories;
    a multiplexer configured to switch data from the first and second memories to the output pipeline;
    a controller in signal communication with both the demultiplexer and the multiplexer and configured to generate read and write pointers which:
    during a first stage, 1) cause the demultiplexer to time and space switch a first frame from the input pipeline to the first memory, and 2) cause the multiplexer to space switch a second frame from the second memory to the output pipeline; and
    during a second stage, 1) cause the demultiplexer to time and space switch a third frame from the input pipeline to the second memory, and 2) cause the multiplexer to space switch the first frame from the first memory to the output pipeline.

18. The two-stage switching element of claim 17 wherein a frame of data is completely switched through the two-stage switching element after the first and second stages.

19. The two-stage switching element of claim 18 wherein the multiplexer is configured to space and time switch data to the output pipeline simultaneously in a single clock cycle.

* * * * *